United States Patent [19]

Karsch

[11] Patent Number: 5,567,371
[45] Date of Patent: Oct. 22, 1996

[54] BLOW MOLDING AND FLUORINATION PROCESS FOR THE PRODUCTION OF HOLLOW BODIES FROM THERMOPLASTIC MATERIALS AND PRODUCTS SO MADE

[75] Inventor: Ulrich Karsch, Niederkassel, Germany

[73] Assignee: Kautex Werke Reinold Hagen Aktiengesellschaft, Bonn, Germany

[21] Appl. No.: 354,997

[22] Filed: Dec. 13, 1994

[30] Foreign Application Priority Data

Dec. 16, 1993 [DE] Germany .................. 43 43 003.1

[51] Int. Cl.⁶ .................. B29C 49/18; B29C 49/46
[52] U.S. Cl. .................. 264/83; 264/526; 264/529
[58] Field of Search .................. 264/83, 526, 529, 264/528

[56] References Cited

U.S. PATENT DOCUMENTS

| 3,862,284 | 1/1975 | Dixon et al. .................. 264/83 |
| 4,617,077 | 10/1986 | Giese et al. .................. 156/245 |
| 4,764,405 | 8/1988 | Bauman et al. .................. 264/83 |
| 5,244,615 | 9/1993 | Hobbs .................. 264/83 |
| 5,292,466 | 3/1994 | Van Bonn et al. .................. 264/83 |
| 5,401,451 | 3/1995 | Meixner et al. .................. 264/526 |

FOREIGN PATENT DOCUMENTS

| 0266439A1 | 5/1988 | European Pat. Off. . |
| 0305740 | 3/1989 | European Pat. Off. . |
| 0500166A1 | 8/1992 | European Pat. Off. . |
| 3529870 | 2/1987 | Germany . |
| 3535602 | 4/1987 | Germany . |
| 3637459 | 5/1988 | Germany . |
| 3840269 | 11/1990 | Germany . |

*Primary Examiner*—Catherine Timm
*Attorney, Agent, or Firm*—Panitch Schwarze Jacobs & Nadel, P.C.

[57] ABSTRACT

In a process for the production of a hollow body such as a fuel tank from thermoplastic material, the wall thereof is subjected to a two-step treatment to influence the permeation properties of the material. In the first treatment step the wall is subjected to the action of a gas mixture containing fluorine and oxygen while in the second treatment step the wall is subjected to the action of a gas mixture which contains fluorine but is oxygen-free.

20 Claims, No Drawings

BLOW MOLDING AND FLUORINATION PROCESS FOR THE PRODUCTION OF HOLLOW BODIES FROM THERMOPLASTIC MATERIALS AND PRODUCTS SO MADE

BACKGROUND OF THE INVENTION

The present invention concerns a process for the production of hollow bodies from thermoplastic material by blow molding and fluorination.

There are a number of situations involving containers made from a thermoplastic material, where there may be a wish or a need to influence the permeation properties of the wall of such a container and make the wall less permeable in relation to certain substances. Such a situation is for example that of a fuel tank which is installed in a motor vehicle. For that purpose, the container of thermoplastic material and in particular a container consisting of a polyolefin such as HDPE may be treated with a gas mixture containing fluorine in order to modify the permeation properties of the container wall.

A process for the production of hollow bodies from plastic material is disclosed in German laid-open application (DE-OS) No 34 35 392 and U.S. Pat. No. 4,617,077, in which the hollow body is produced by means of extrusion blow molding and fluorination, the gas mixture used for the fluorination treatment being oxygen-free. In another process, as disclosed in German laid-open application (DE-OS) No 36 37 459 and German patent specification No 3 840 269, the permeation properties of containers comprising polymers of ethylene or propylene can be improved by a treatment involving the use of a gas mixture which, besides fluorine, also contains oxygen.

While all the above-discussed processes for influencing the permeation properties of walls of hollow bodies made from plastic material using fluorine, for example in the case of fuel tanks, give rise to a noticeable improvement in such properties in terms of reducing the degree of permeability of the container wall in relation to fuels or components thereof, it is difficult, in consideration of the fact that the relevant applicable requirements are steadily becoming more and more strict, to achieve the values which in future times will still be admissible, in regard to the amounts of fuel or fuel components which escape from such a container or tank by diffusion, per unit of time. In that respect the composition of the fuel also plays a considerable part as for example the permeation properties of fluorinated polymers vary in dependence on the alcohol content and in particular the methanol content of the fuel contained in a container made from such a material. Thus, when the fuel contains certain proportions of methanol, the permeability of such fuel tank walls markedly increases, with the result that it is frequently no longer possible to comply with the limit values prescribed in many if not most countries. The endeavour is to reduce the degree of permeation to very low values, for example less than 0.3 g/24 hours per tank, even in relation to alcohol-bearing fuels. That is something that can scarcely be achieved with the fluorination procedures which are usually employed nowadays. A further difficulty in this respect is that it is necessary to reckon on the composition of the fuel fluctuating, for example in such a fashion that, during the service life of a normal vehicle and the tank fitted therein, the tank my be filled with fuels of differing compositions, including fuels with variations in regard to the proportion of alcohol therein.

SUMMARY OF THE INVENTION

An object of the present invention is to provide a process for the production of hollow bodies from a thermoplastic synthetic polymer by blow molding and fluorination, with which the above-mentioned disadvantages of the prior procedures are at least considerably reduced.

Another object of the present invention is to provide a process for the production of hollow bodies such as tanks for fuels, from a thermoplastic polymer, which makes it possible to achieve low permeation values, even in respect of alcohol-bearing fuels and with different compositions in respect of commercially available fuels, in particular in regard to the alcohol content, such that the permeation values achieved comply with present or expected requirements.

Still another object of the present invention is to provide a process for the production of a hollow body from a thermoplastic synthetic polymer by blow molding and subsequent fluorination, which affords a reduced degree of permeation through the wall of the hollow body, and wherein that improvement is maintained over a prolonged period of time.

A still further object of the present invention is to provide a process for the production of hollow bodies from thermoplastic synthetic polymer, which enjoy improved resistance to permeation through the wall of the hollow bodies, wherein such improvement can be achieved without a significantly major increase in cost.

A still further object of the present invention is to provide a process for the production of a hollow body from thermoplastic synthetic polymer, such that the hollow body enjoys increased resistance to permeation through the wall thereof while the process can also be carried out using already existing equipment.

Yet a further object of the present invention is to provide a hollow body produced by extrusion blow molding, which affords enhanced resistance to permeation through the wall thereof.

In accordance with the principles of the present invention the foregoing and other objects are achieved by a process for the production of a hollow body from a thermoplastic synthetic polymer by blow molding and fluorination. A preform which is preferably tubular is formed and expanded within a blow molding mold using a gaseous pressure agent until the preform bears against the internal contour of the mold. The inside wall of the resulting hollow body is treated within the mold by a fluorination procedure to make it less permeable in relation to at least one substance. The fluorination treatment is effected in first and second steps, wherein in a first treatment step the hollow body is treated with a gas mixture which contains fluorine and oxygen. In the second treatment step the hollow body is treated with a fluorine-bearing gas mixture which is oxygen-free.

It has been found that the wall of a hollow body when treated in that way has extremely advantageous permeation properties, in particular in relation to fuels, more specifically even when the fuels contain alcohol and more especially methanol. Even when, in the case of containers such as tanks which are produced by the process according to the invention, the degree of permeation of the wall thereof undergoes certain changes in dependence on specific components contained in the fuel, for example methanol, the extent of such changes is so slight that it is generally possible not to exceed the admissible limit values in terms of permeation through the wall of the container or tank.

The first and second treatment steps can be carried out as long as the hollow body is still in the mold. In that respect it is advantageous for the preform firstly to be expanded using an inert gas, whereupon the internal pressure in the expanded hollow body is reduced and then the reaction gas mixture containing fluorine and oxygen is introduced into the expanded hollow body, to carry out the first treatment step in the process. That first treatment step is advantageously carried out at a temperature which is above the crystallite fusion temperature of the respective polymer material used. Thus, when using polyethylene, this treatment can be carried out at a temperature of for example about 150° C.

After the first treatment step, the hollow body which is still disposed in the blow molding mold is flushed or purged with an inert gas, for example nitrogen, in order in that way to produce an oxygen-free atmosphere within the hollow body. The flushing or purging gas can also be used to reduce the temperature as it has been found that the second treatment step of the process according to the invention gives particularly good results when lower temperatures are employed. Fluorine is then introduced into the inert atmosphere produced in that way, in order to carry out the second treatment step of the process of the invention. In that respect for example the procedure adopted may be as described in German laid-open application (DE-OS) No 34 35 592 or U.S. Pat. No. 4,617,077.

As it is possible and even advantageous for the second treatment step to be carried out at ambient temperature, it is also possible to operate in such a way that the second treatment step is performed at a later time, outside the blow molding mold, that is to say, independently of the procedure for production of the actual hollow body or container. The optimum procedure adopted may also depend on the polymer constituting the plastic hollow body or container. Apart from polymers of ethylene, it is also possible to use polymers of propylene, utilizing the teaching in accordance with the present invention.

In general terms, it will be desirable for the second treatment step to involve a higher level of fluorine concentration in the gas mixture, than in the first treatment step. It may further be desirable and possibly even necessary for the second treatment step to involve a longer period of action of the reaction gas mixture, than the period of action used in the first treatment step. It will be noted however that, to a certain degree, this also depends on the level of concentration of fluorine in the gas mixture. In other words, with a higher concentration of fluorine, in particular in the second treatment step, the period of action of the reaction gas mixture to achieve a given effect can be shorter.

In all cases, the structure produced by the first treatment step, at the inside surface of the hollow body or container produced by the process of the invention, is also maintained in the second treatment step. Nonetheless, the combination of the two treatment steps in the described sequence gives rise to permeation values which cannot be achieved with the above-discussed prior processes, in particular when considering alcohol-bearing fuels.

Although, with the process according to the invention, the comparatively smooth inside surface of the wall of the hollow body, which smooth surface is produced in the first treatment step by the application of a gas mixture containing fluorine and oxygen, is then exposed to a second treatment step which normally, that is to say when employed on its own, would result in a microscopically rough surface, the substantially flat surface which is generally present after the first treatment step is still retained after the second treatment step, more especially with the surprising result that the wall of the hollow body maintains its low degree of permeability, even if the composition of the fuel were to result in a comparatively high degree of permeability, in relation to a wall which had been treated only with a gas mixture containing both fluorine and oxygen.

Further features and advantages of the present invention will be apparent from the following Example.

EXAMPLE

This Example concerns hollow bodies in the form of fuel tanks or containers made from a thermoplastic synthetic polymer by blow molding and fluorination, the procedure being such that a preferably tubular preform is first formed and expanded within a blow molding mold using a gaseous pressure agent until it bears against the internal contour of the blow molding mold, thus producing a hollow body of the required configuration.

More specifically, the hollow bodies involved were identical fuel containers made from polyethylene, namely Lupolen 4261A from BASF. Those containers were subjected to different forms of treatment.

In the first case, the container was treated with a gas mixture containing fluorine and oxygen, at a temperature above the crystallite fusion temperature of the specified polyethylene.

In the second case the container was treated with a gas mixture which contained fluorine but which was oxygen-free, above the crystallite fusion temperature.

In the third case, the container was subjected to treatment using the process according to the invention. For the first treatment step, the conditions in regard to oxygen and fluorine content and temperature were those which were also used in the procedure involving only one treatment step as referred to above in case 1. In the second treatment step the treatment was effected under the conditions specified in case 2 above, but at a temperature below the crystallite fusion temperature.

The respective gas mixtures used, besides fluorine, and fluorine and oxygen respectively, also contained nitrogen as an inert gas. The average wall thickness of all the containers tested was 4 mm.

The operations for determining the permeability values, which were carried out after the respective treatment procedures, were effected with a fuel mixture referred to as M15, that is to say a fuel with a methanol content of 15%.

The permeation values obtained in each case were as follows:

Case 1 (treatment with a gas mixture containing fluorine and oxygen): 4.5 g/24 hours.

Case 2 (treatment with a gas mixture which contains fluorine but is oxygen-free): 2 g/24 hours.

Case 3 ( two-step treatment ): 0.2 g/24 hours.

It has been found that it is desirable for the treatment in the first step to be effected using a gas mixture which contains between about 0.01 and 5% by volume of fluorine. The treatment in the first step is preferably also effected with a gas mixture with between about 0.5 and 25% by volume of oxygen. The period of action of the gas mixture during the first treatment step may be between about 5 and 60 seconds.

The treatment in the second step may be effected using a gas mixture which contains between about 0.5 and 20% by volume of fluorine and the period of action thereof may be between about 10 seconds and 120 minutes. As indicated above, both the treatment steps may be carried out within the mold but the second treatment step may alternatively be carried out outside the mold. The preform may be expanded using a gas mixture containing no fluorine.

The result of the process of the invention is accordingly a hollow body produced by extrusion blow molding, which at least predominantly comprises a thermoplastic synthetic polymer, wherein the nature of the inside surface thereof is produced by treatment firstly with a gas mixture containing fluorine and oxygen and thereafter with a gas mixture containing fluorine but which is oxygen-free. The hollow body is preferably in the form of a fuel tank and the polymer may be a polymer of ethylene or propylene.

It will be appreciated that the above-described invention has been set forth solely by way of example and illustration of the principles thereof and that various modifications and alterations may be made therein without thereby departing from the spirit and scope of the invention.

What is claimed is:

1. A process for the production of a hollow body from a thermoplastic synthetic polymer by blow molding and fluorination, comprising expanding a preform within a blow molding mold using a gaseous pressure agent until a hollow body resulting from the expanded preform bears against the internal contour of the mold, and subjecting an internal wall surface of the resulting hollow body to a fluorination treatment to make the wall surface less permeable in relation to at least one substance, said treatment comprising a first treatment step in which the wall surface is treated with a gas mixture which contains fluorine and oxygen and thereafter a second treatment step in which the wall surface is treated with a gas mixture which contains fluorine but no oxygen.

2. A process as set forth in claim 1 wherein the preform is tubular.

3. A process as set forth in claim 1 wherein the first and second treatment steps are effected sequentially, and wherein between the first treatment step and the second treatment step the hollow body is purged with an inert gas for removing the oxygen from the hollow body.

4. A process as set forth in claim 1 wherein the fluorine content in the treatment gas during the second treatment step is greater than during the first treatment step.

5. A process as set forth in claim 1 wherein the period of action of the gas mixture during the second treatment step is longer than during the first treatment step.

6. A process as set forth in claim 1 wherein the hollow body is cooled between the first and second treatment steps.

7. A process as set forth in claim 1 wherein the first treatment step is carried out at a temperature above the crystallite fusion temperature of the polymer.

8. A process as set forth in claim 1 wherein the treatment in the first treatment step is effected using a gas mixture which contains between about 0.01 and 5% by volume of fluorine.

9. A process as set forth in claim 1 wherein the treatment in the first treatment step is effected with a gas mixture which contains between about 0.5 and 25% by volume of oxygen.

10. A process as set forth in claim 1 wherein the period of action of the gas mixture during the first treatment step is between about 5 and 60 seconds.

11. A process as set forth in claim 1 wherein the second treatment step is carried out with a gas mixture which only contains fluorine and inert gas.

12. A process as set forth in claim 1 wherein the second treatment step is carried out at a temperature below the crystallite fusion temperature of the polymer.

13. A process as set forth in claim 12 wherein the second treatment step is carried out at ambient temperature.

14. A process as set forth in claim 1 wherein the treatment in the second treatment step is effected using a gas mixture which contains between about 0.5 and 20% by volume of fluorine.

15. A process as set forth in claim 1 wherein the period of action of the gas mixture during the second treatment step is between about 10 seconds and 120 minutes.

16. A process as set forth in claim 1 wherein the first treatment step is carried out within the blow molding mold.

17. A process as set forth in claim 1 wherein the second treatment step is carried out within the blow molding mold.

18. A process as set forth in claim 1 wherein the second treatment step is carried out outside the blow molding mold.

19. A process as set forth in claim 1 wherein the preform is expanded using a fluorine-free gas.

20. A process as set forth in claim 1 wherein the preform is expanded using a fluorine-free gas mixture.

* * * * *